United States Patent [19]

Poulin

[11] Patent Number: 5,035,445
[45] Date of Patent: Jul. 30, 1991

[54] BRAKE MECHANISM FOR CARTS AND DOLLIES

[76] Inventor: Willie F. Poulin, 10647½ Crockett St., Sun Valley, Calif. 91352

[21] Appl. No.: 470,779

[22] Filed: Jan. 26, 1990

[51] Int. Cl.⁵ .............................................. B60S 9/02
[52] U.S. Cl. ............................ 280/763.1; 280/79.11; 188/5
[58] Field of Search ............... 280/47.34, 79.11, 79.3, 280/79.7, 763.1, 33.994, 764.1; 188/5, 6, 7, 19, 23

[56] References Cited

U.S. PATENT DOCUMENTS

| | | | |
|---|---|---|---|
| 2,537,909 | 1/1951 | Puddester | 155/30 |
| 2,942,693 | 6/1960 | Johnson | 188/5 |
| 3,090,634 | 5/1963 | Hesketh et al. | 280/31 |
| 4,815,569 | 3/1989 | Norman | 188/5 |

*Primary Examiner*—Andres Kashnikow
*Assistant Examiner*—Richard Camby
*Attorney, Agent, or Firm*—James Bartholomew

[57] ABSTRACT

A brake mechanism is provided with brake pedals that are pivotably attached to opposite sides of a cart, or the like, by hinges and mounting brackets. Each brake pedal includes a downwardly extending leg having a friction foot at a distal end thereof. The brake pedals are pivotable to a braking position whereat the friction feet are frictionally engaged with the ground, thereby anchoring the cart, or the like, in place. One or more crossbars connect the brake pedals so that the pedals pivot in unison. A crossbar is provided which engages the underside of the cart to thereby limit the pivotal travel of the brake pedals. Adjustable length crossbars are preferred so that the dimensions of the brake mechanism can be adjusted for retrofit application with various sized dollies, or the like. A quick release locking device is provided to maintain the brake pedals in the braking position as well as in a freewheeling position. Alternatively, the friction feet can be provided on an angled crossbar which is operatively connected to the brake pedals. The friction feet are either spring biased or adjustable in length for optimum contact with the ground.

20 Claims, 3 Drawing Sheets

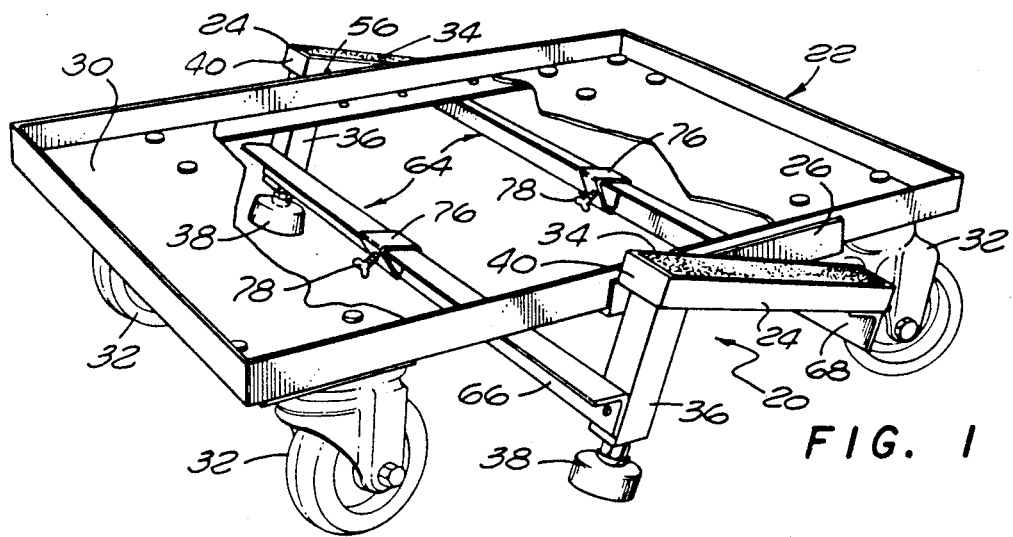

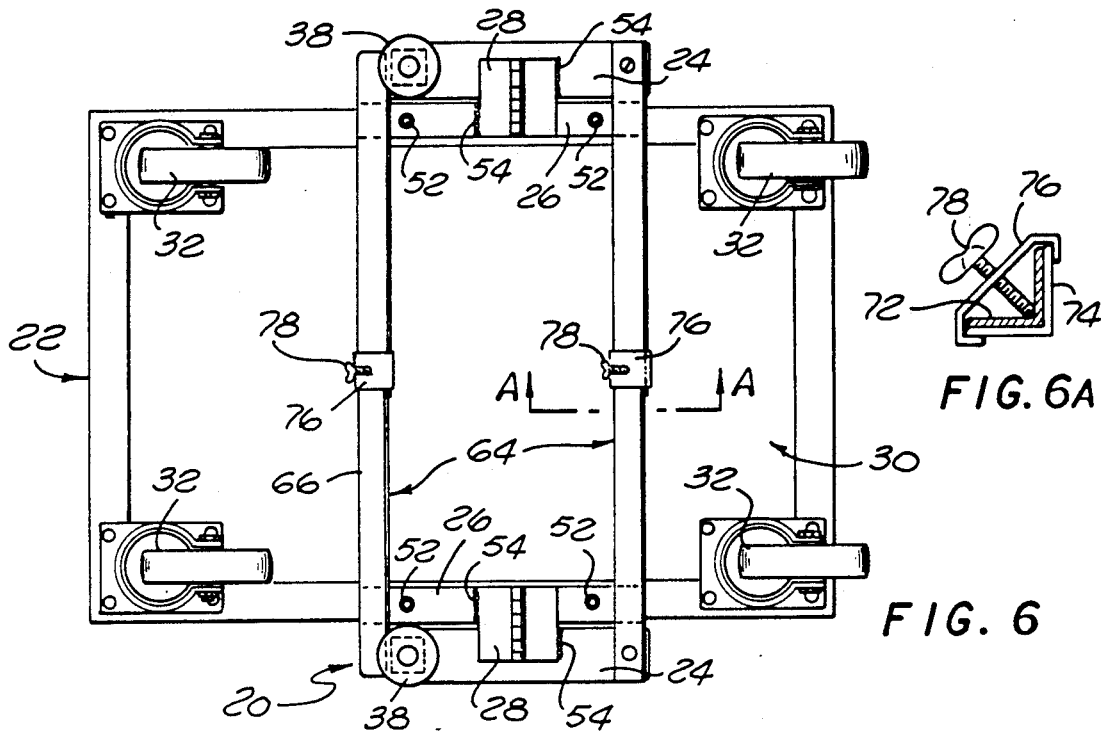
FIG. 6
FIG. 6A
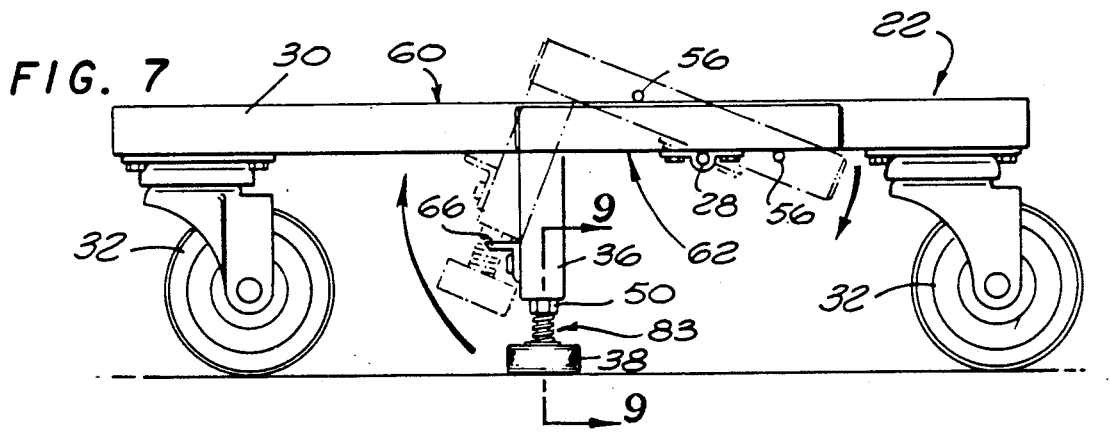
FIG. 7
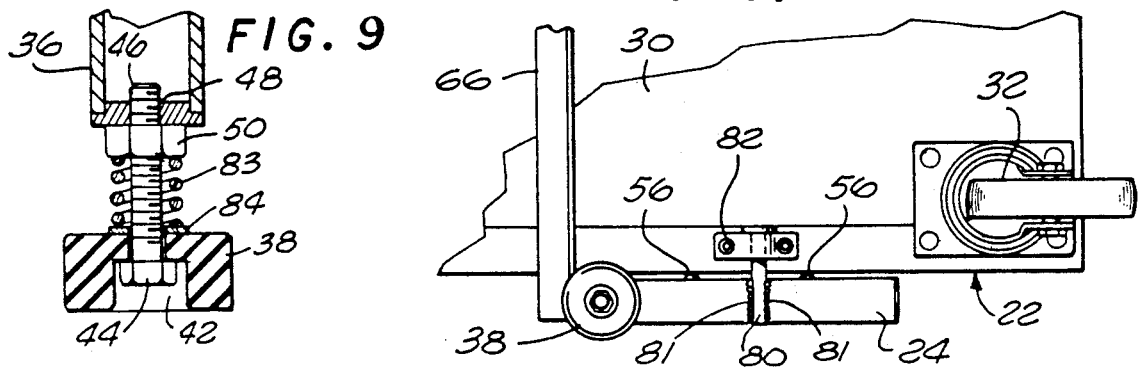
FIG. 9
FIG. 8

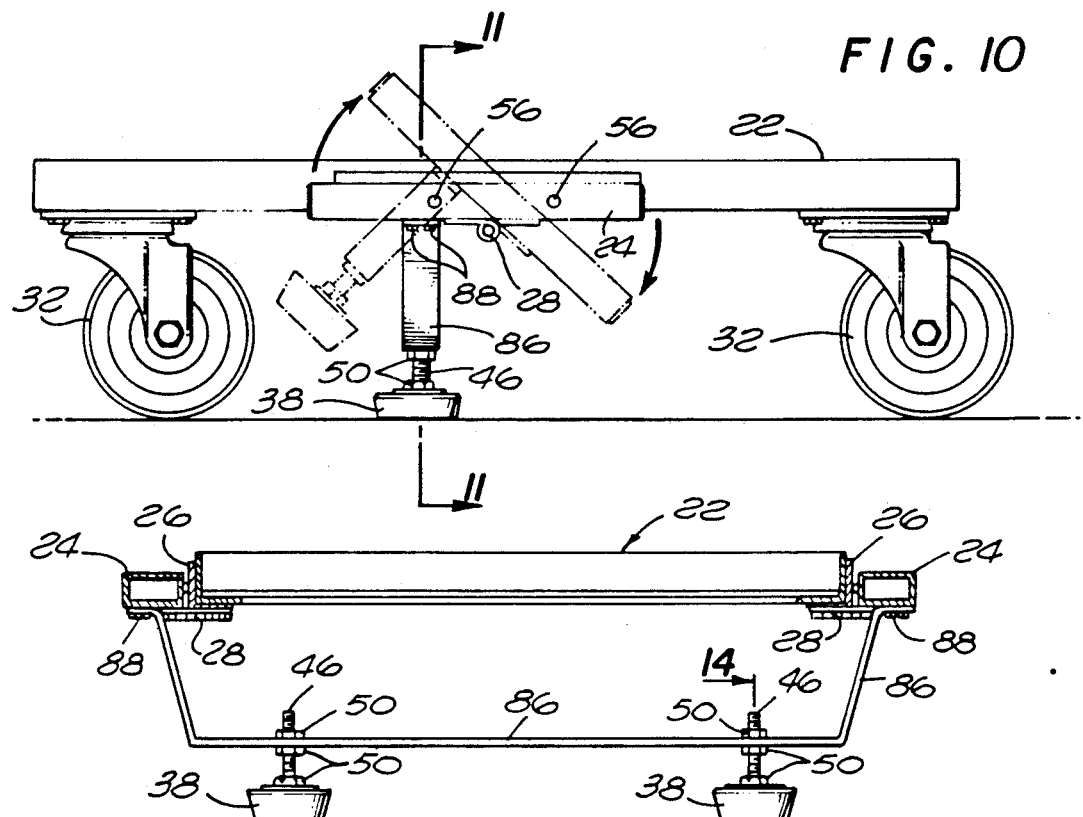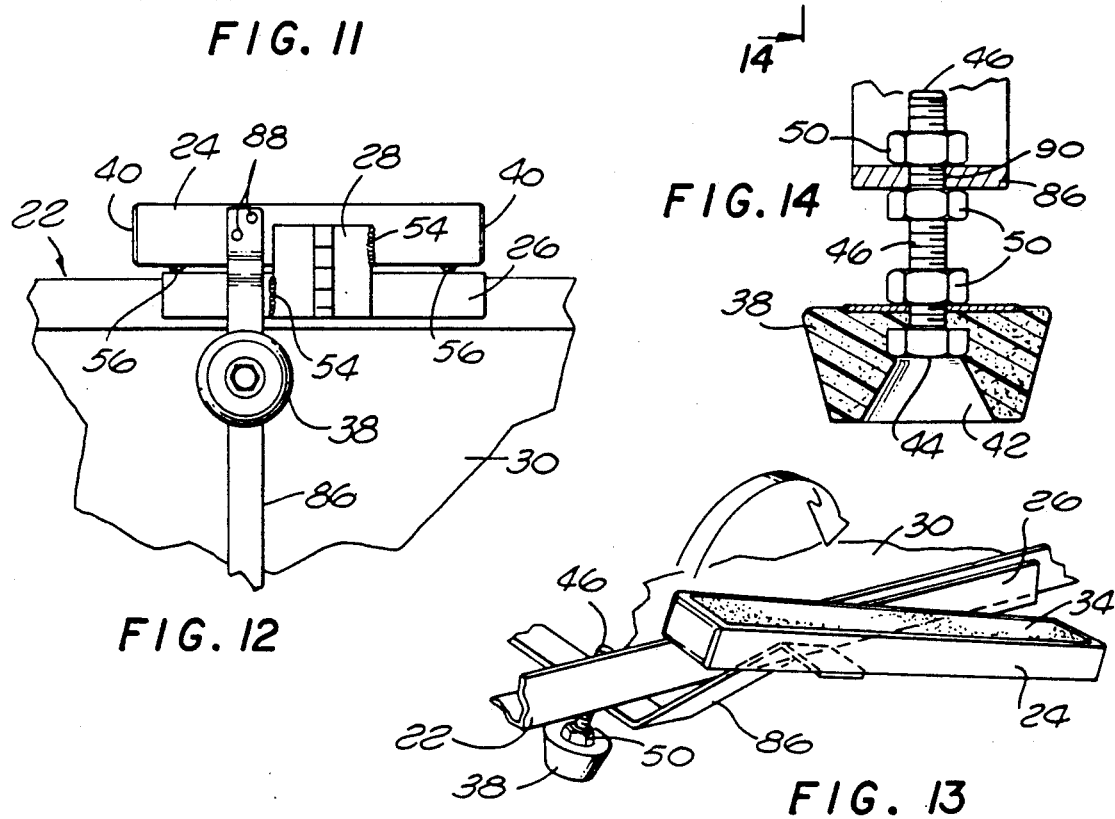

BRAKE MECHANISM FOR CARTS AND DOLLIES

BACKGROUND OF THE INVENTION

This invention relates generally to an improved brake mechanism for anchoring a cart, dolly, or the like, in a stable, stationary position in order to facilitate loading and/or unloading of the cart or dolly. More particularly, this invention relates to a brake mechanism having dual foot pedals, which advantageously enable one to effect a braking action from either of two opposite sides of a cart, or the like, and an adjustable width which enables the brake mechanism to be retrofit to various sized carts or dollies.

In general, prior carts and dollies ride on a plurality of casters, each of which must be individually braked in order to stabilize the cart or dolly against movement. Often, an oversized load being transported by a prior dolly, or the like, would hinder or prohibit one from having easy access to every caster that must be braked. Similarly, the use of a prior cart or dolly of this type in close quarters would also prevent one from readily braking those casters made inaccessible by restrictive confines. Thus, with this prior braking arrangement, one may only be able to brake some of the casters and, as a result, the cart or dolly will be undesirably movable. Moreover, the prior requirement of individually locking a plurality of casters is disadvantageously time-consuming.

The prior art also includes a variety of braking mechanisms which will anchor a cart, or the like, in a stationary position without requiring one to lock each caster individually against movement. Examples of such braking mechanisms include U.S. Pat. Nos. 2,942,693 and 4,815,569. However, in general, other prior braking devices have also been less than ideal. Some prior mechanisms, for example, U.S. Pat. No. 2,537,909, provide braking with an arrangement which is somewhat mechanically complex, thereby undesirably increasing manufacturing costs. Other prior art braking devices for carts, or the like, utilize a brake actuator which is not foot operated, thereby requiring one to bend over to brake such devices with a hand operated actuator. This arrangement may be troublesome for those having physical problems that make bending difficult.

Other prior art braking mechanisms utilize a kick stand type arrangement which makes a cart immobile by lifting its casters off the ground such that the cart is resting entirely upon the kick stand or similar mechanical support means. The disadvantage of this type of device is that when transporting a heavy load, its weight may prohibit elevation of the cart by mechanical means for elevating casters above an underlying floor surface.

Yet another drawback commonly found in prior art braking mechanisms is the provision of only one brake actuator. This allows access to the brake actuator at only one location on an associated cart, dolly, or the like. Often, a single brake actuator is rendered relatively inaccessible by close quarters, oversized loads, etc. A further drawback of prior art brake mechanisms is that most are not designed to be retro-fit onto an existing dolly, or the like, because of the absence of means for adjusting the dimensions of the brake apparatus to fit the dimensions of a selected cart or dolly.

There exists, therefore, a significant need for a brake mechanism for carts and dollies that has adjustability which permits one to retrofit the brake apparatus to existing carts, or the like, and which provides plural brake actuators so that at least one actuator will be accessible in close quarters. Additionally, a brake mechanism is needed which can be actuated without requiring one to bend over or stabilize individual casters. Such a brake mechanism should be extremely quick and easy to operate from either of two opposite sides of a cart or dolly in case access to one side is obscured by surrounding confines or a load being transported. The present invention fulfills these needs and provides further related advantages.

SUMMARY OF THE INVENTION

In accordance with the invention, a brake mechanism is provided for freewheeling mobile units, in particular for carts, dollies, carriages, and the like. The brake mechanism includes foot operated brake pedals pivotably mounted at opposites sides of a dolly, or the like, and operatively connected to friction feet which grip the floor to anchor the dolly, or the like, in a stationary position. After braking, the pedals and the friction feet controlled thereby, are maintained in a braked position by quick release lock means that enable one to resume freewheeling use of the dolly, or the like, by simply stepping on either pedal.

The present invention allows application of a braking action in an extremely quick and easy fashion which, conveniently for the user, does not require one to bend over or stabilize individual casters as had often been the case previously. Advantageously, this invention provides brake pedals on opposite sides of a cart, or the like, thereby increasing pedal accessibility when the cart is used in close quarters or with oversized loads. Prior art brake mechanisms commonly provide only a single brake actuator which may be out-of-reach in the afore-mentioned circumstances. Further advantages of the present invention include means for adjusting the size of the brake mechanism so that it can be retrofit onto a variety of different sized carts, dollies, etc., and friction feet which are adjustable and/or spring biased for contacting the floor in an optimum manner.

In a preferred form of the invention, the brake mechanism includes two brake pedals, each configured with sufficient upwardly facing surface area to accommodate stepping thereupon with one's foot to effect braking. Each brake pedal has a downwardly extending leg with a friction foot, such as a brake pad or rubber stopper, located at a distal end thereof. The brake pedals are attached to opposite sides of any freewheeling mobile unit, such as a dolly, by mounting bracket means.

The mounting bracket means may be attached to the mobile unit in any conventional manner, however, each brake pedal is pivotably connected to its respective mounting bracket means by, for example, hinge means or an axle rod and axle bracket arrangement. This enables the foot operated brake pedals to be pivoted from a freewheeling position, whereat the associated friction feet are elevated above an underlying floor surface, to a braking position, whereat the friction feet are lowered, gripping the floor to anchor the mobile unit in place.

Preferably, the friction feet are spring biased into tighter engagement with the floor and/or include adjustable means for optimum floor contact. Preferred adjustable means comprise feet fixed on threaded shafts that are screwed a selected, adjustable length into threaded ports on the underside of the brake pedal legs. Alternatively, the friction feet can be fixed at a selected, adjustable length from the legs using lock nuts to position the shafts in unthreaded ports. The combined length of each leg and its associated foot is sufficient to bring the foot into tight engagement with the floor upon actuation of a brake pedal.

Advantageously, actuation of either brake pedal causes both pedals and their respective friction feet to effect a braking action. This is because at least one crossbar passing beneath the mobile unit connects the pedals and causes them to move in unison. Thus, only one brake pedal need be stepped upon in order to employ the gripping action of two or more friction feet and thereby gain the added stability associated with anchoring the mobile unit at a plurality of points (i.e. feet) rather than at a single spot.

The at least one crossbar connecting the brake pedals at opposite sides of a cart, dolly, or the like, also provides a number of other advantageous features. In contrast to prior brake devices, the brake mechanism is adjustable in size to retrofit onto different sized mobile units because one or more adjustable length crossbars are used to connect the pedals. This is preferably achieved by comprising each crossbar of two angle irons that fit one within the other and are slidably movable relative to each other. Thumbscrew actuated clamping means enables one to fix the relative positions of the angle irons, and thus, the effective crossbar length, without needing tools.

Moreover, the at least one crossbar will catch upon the underside of the mobile unit at an appropriate point in the pedals' pivoting range, thereby providing pivot stop means for limiting the pivotal motion of the brake pedals. This prevents the pedals from assuming a substantially vertical profile that would present difficulty to one trying to step upon said pedals. Furthermore, the crossbar provides a useful handle for carrying the dolly, or the like, to which the present invention is attached.

The quick release lock means preferably comprises detent means including one or more quick release pins, bullet catches, or the like, on each brake pedal that mate with corresponding apertures provided on the body of the mobile unit. The detent means serve to lock the brake pedals in the braking position until either brake pedal is stepped upon with sufficient force to disengage the quick release pins or the like, from their respective retaining apertures. In order to improve traction of a user's feet upon the foot-operated brake pedals, each pedal is provided with an appropriately located no-skid strip or frictional surface.

In another preferred form of the invention, the friction feet extend downwardly from an angled crossbar used in lieu of the afore-mentioned legs.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a brake mechanism embodying the invention, showing brake pedals pivotably attached to opposite sides of a dolly, with the dolly illustrated partly in cut-away section to reveal crossbars that connect the pedals;

FIG. 2 is a side elevation view of the dolly of FIG. 1 being anchored in place by the brake mechanism, with the brake pedals shown in a braking position whereat friction feet attached to said pedals contact the ground, also illustrating (in phantom outline) the pedals in a free-wheeling position whereat the friction feet are elevated above the ground;

FIG. 3 is an enlarged, fragmentary cross-sectional view taken generally on line 3—3 of FIG. 2, illustrating engagement of a quick release pin or bullet catch on a brake pedal with an aperture in a mounting bracket to releasibly lock the pedal in the braking position; also showing a friction foot attached to the pedal's downwardly extending leg by a threaded shaft which allows adjustment of the extension of said foot;

FIG. 4 is an enlarged, fragmentary cross-sectional view taken generally on line 4—4 of FIG. 2, illustrating engagement of a second quick release pin or bullet catch on the brake pedal with a second aperture in the mounting bracket, also showing attachment of one crossbar to the underside of the brake pedal;

FIG. 5 is a fragmentary side elevation view illustrating the manner in which the crossbar attached to each leg of the brake pedal functions as a pivot stop by abutting with the underside of the dolly to limit the pivotal motion of the brake pedals;

FIG. 6 is a bottom plan view of the brake mechanism and dolly of FIG. 1, illustrating hinges which pivotably connect the brake pedals with their mounting brackets, also showing preferred weld locations for effecting this connection and thumbscrew clamps for fixing the length of adjustable crossbars;

FIG. 6A is an enlarged cross-sectional view taken generally on line A—A of FIG. 6, illustrating two angle irons which slidably fit one within the other to comprise an adjustable length crossbar, also showing a thumbscrew clamp for fixing said angle irons against relative movement;

FIG. 7 is a side elevation view of another preferred embodiment of the invention, wherein only one crossbar is utilized and the friction feet are spring biased into engagement with the ground, also showing (in phantom outline) how the single crossbar provides a pivot stop in the same manner as discussed with reference to FIG. 5;

FIG. 8 is a fragmentary bottom plan view of the brake mechanism and dolly of FIG. 7, illustrating attachment of a brake pedal to the dolly using an axle rod and axle bracket arrangement rather than the hinge attachment shown in FIG. 6;

FIG. 9 is an enlarged, fragmentary cross-sectional view taken generally along line 9—9 of FIG. 7, illustrating a spring biased friction foot attached to a leg by a threaded shaft;

FIG. 10 is a side elevation view of a dolly being anchored in place by another embodiment of the brake mechanism attached thereto, also illustrating (in phantom outline) the brake mechanism in a free-wheeling position;

FIG. 11 is a cross-sectional view taken generally on line 11—11 of FIG. 10, illustrating two friction feet adjustably attached to an angled crossbar, also showing brake pedals attached to opposite sides of the dolly of FIG. 10;

FIG. 12 is an enlarged fragmentary bottom plan view of the brake mechanism and dolly of FIG. 10, illustrating a hinge that pivotably connects one brake pedal of FIG. 11 to a mounting bracket, with the opposite brake pedal (not shown) being similarly mounted, also showing preferred weld locations for fastening the hinge to said pedal and said bracket;

FIG. 13 is an enlarged fragmentary perspective view illustrating the manner in which the angled crossbar of FIG. 11 functions as a pivot stop by abutting the underside of the dolly to limit the pivotal motion (indicated by arrow) of each brake pedal; and FIG. 14 is an enlarged fragmentary cross-sectional view taken generally along line 14—14 of FIG. 11, illustrating attachment of a friction foot to the angled crossbar by a threaded shaft which provides adjustment means.

DETAILED DESCRIPTION OF THE PREFERRED EMBODIMENT

As shown in the drawings for purposes of illustration, the present invention resides in a brake mechanism 20 for releasibly anchoring a freewheeling mobile unit, such as a dolly 22, cart, or the like, in a stationary position. In contrast to many prior brake mechanisms having only a single brake actuator (which often is rendered inaccessible by transported loads or close confines), the brake mechanism of the present invention provides a foot-operated, brake actuating pedal 24 at each of two opposite sides of the dolly 22, as shown in FIG. 1. Thus, the present invention facilitates braking by providing two brake pedals 24, at least one of which is generally readily accessible, even in the above-noted restrictive circumstances, and either of which enable one to effect a positive braking action in an extremely quick and easy manner by merely stepping thereupon.

The present invention provides a number of advantageous features. The brake mechanism is adjustable in size so that it can be retrofit onto various sized mobile units. The brake pedals actuate friction feet that are also adjustable for optimum braking contact with the ground. In contrast to many prior brake mechanisms, the present invention provides a positive braking action without requiring one to bend over or stabilize individual casters. Moreover, the brake mechanism 20 advantageously utilizes one or more crossbars to provide a fourfold function as 1) handle means, 2) pivot stop means for the brake pedals, 3) adjustable size means for the afore-mentioned retrofit usage, and 4) connecting means for joining the pedals so that said pedals move in unison, thus requiring that only one pedal be actuated in order to effect the combined braking power of the friction feet operated by both pedals.

In accordance with the present invention, and with reference to FIGS. 1 and 6, first and second brake pedals 24 are pivotably attached to first and second mounting brackets 26 by hinges 28. Although the illustrative drawings show the brackets 26 mounted to opposite sides of a dolly 22 comprising a platform 30 mounted on casters 32, it must be understood that the brake mechanism 20 is compatible with most other freewheeling mobile units such as carts, carriages, etc. and the dolly 22 is shown herein for illustrative purposes only. Depiction of a dolly herein shall not be construed as limiting the scope of applications of the present invention with other freewheeling mobile units.

Each brake pedal 24 is configured with a generally upwardly facing surface area along its top edge, with said surface area sufficiently sized to accommodate one's foot stepping thereupon to apply a braking action. Preferably, traction is improved by applying one or more "no skid" strips 34 atop each brake pedal 24. Alternatively, a frictional surface, for example, a knurled area, can be provided on foot-receiving pedal portions in lieu of the "no skid" strips 34.

A leg 36 extends downwardly from the underside of each brake pedal 24, preferably oriented substantially perpendicular to the pedal from which it projects. The legs 36 are substantially equal in length and extend from their respective pedals 24 to a distance which is equal to the distance which the casters 32 support the platform 30 above ground level. Each leg 36 has a friction foot 38, such as a rubber stopper or brake pad, adjustably attached thereto at a distal end thereof.

With reference to FIG. 2, when the brake pedals 24 are in a substantially horizontal braking position (indicated in solid lines), the length of the legs 36 is sufficient to bring the friction feet 38 into frictional engagement with the floor surface underlying the casters 32, thereby releasably anchoring the dolly 22 in a stationary stabilized position to prevent its unintentional movement. The engagement of the friction feet with the floor surface does not jack the casters 32 up above ground level so that said casters will remain in contact with the ground at all times. This is desirable for maximum stability when transporting a heavy load with the dolly 22 and is in direct contrast to prior art kickstand type brake mechanisms (see, for example, U.S. Pat. No. 4,815,569) that elevate casters above ground, thereby placing the associated mobile unit being braked in a less stable orientation. Moreover, wherein the present brake mechanism is always easily actuated, regardless of the weight of the load being transported by the dolly 22, those prior braking devices which elevate an entire mobile unit above ground may be difficult to utilize when the mobile unit is heavily weighed down by its load.

The hinges 28 allow the brake pedals 24 to be pivoted approximately 45 degrees to a freewheeling, or brake release, position (shown in phantom outline) whereat the friction feet 38 are elevated above ground level so that the dolly 22 is freely movable. The length of the legs 36 must also be such that the friction feet 38 are maintained out of contact with the ground when the brake pedals 24 are in the freewheeling position.

Preferably, both the brake pedals 24 and their associated legs 36 are comprised of metal tubing having a square cross sectional profile. It is preferred that each leg 36 be welded to its respective pedal 24, however, the brake pedals 24 can be operatively connected to the legs 36 in any other conventional manner. A plastic cap 40 (FIG. 1) is preferably fitted over exposed ends of the metal tubing comprising the brake pedals 24 in order to add a finished appearance and prevent any rough tubing edges from being exposed.

The friction feet 38 are preferably comprised of medium hard open cell Neoprene rubber. Other materials are suitable provided that alternative materials present a friction surface which will not slide over an underlying floor surface. In FIG. 3, one preferred embodiment of a friction foot 38 is shown having a recess 42 which accommodates a hex head 44 of a threaded shaft 46 that extends upwardly through the friction foot 38 and into a threaded port 48 located in the underside of the leg 36. A nut 50 aids one in fixing the extension of the threaded shaft 46 from its threaded port 48. The threaded shaft 46 enables one to adjust the distance that the friction foot 38 extends from the leg 36, thereby allowing optimum contact to be achieved between the leg 36 and the ground below.

With reference again to FIG. 6, the mounting brackets 26, which preferably are angle irons, are attached parallel to the longitudinal axis of the dolly 22 at opposite sides thereof by a plurality of bolts 52, rivets, or the like. The hinges 28 are attached to the mounting brackets 26 and the brake pedals 24 at preferred weld locations 54.

When the brake pedals 24 are in the braking position, as shown in solid outline in FIG. 2, they are maintained in said position (with the friction feet 38 operatively connected thereto engaging the ground) by releasible lock means. Preferably, the releasible lock means comprises detent means for locking each brake pedal 24 in an orientation parallel to its respective mounting bracket 26. For added stability, it is preferred that detent means be provided on either side of each hinge 28, for example, at points along the vertical axis defined by cross sectional lines 3—3 and 4—4 in FIG. 2.

With reference now to FIGS. 3 and 4, a preferred embodiment of the detent means is shown, namely provision of quick release pins 56 or bullet catches at locations on the brake pedal 24 which align with apertures 58, or similar orifices, provided in the mounting brackets 26. The detent means are designed to disengage when downward pressure is applied to that end of either brake pedal 24 which is opposite its leg 36, thereby allowing the pedals to pivot to the freewheeling or brake release orientation shown in phantom outline in FIGS. 2, 7 and 10. Alternatively, the quick release pins 56 could be located on the mounting brackets 26 for engagement with apertures provided in the brake pedals, or the quick release pins could be spring biased so that said pins are depressible into their respective brake pedals when disengagement is required. It must be noted that other quick release lock means are within the scope of the present invention.

The quick release pins or bullet catches 56 are advantageously located on inwardly facing sides of the brake pedals 24 such that said pins provide releasible locking means for maintaining each pedal in a freewheeling position, whereat the friction feet 38 are above ground level, as shown in phantom outline in FIGS. 2, 7 and 10. This is achieved by placement of two pins or bullet catches 56 on opposite sides of the hinge means joining each pedal 24 and mounting bracket 26 (see pin placement in FIGS. 8, 10 and 12), with said pins being spaced apart by a distance that will span the diagonal length between an upper rim 60 (see FIG. 7) and a lower edge 62 of a dolly platform 30, along an axis that is substantially parallel to the orientation of the longitudinal axis of a brake pedal when said pedal is in the freewheeling position, as for example in FIGS. 1 and 5. In this tilted freewheeling brake position, two quick release pins 56 are positioned such that one pin will abut the upper rim 60 and the other pin will catch upon the lower edge 62 of the dolly 22. Exemplary pin placements are indicated on the phantom outline pedal of FIG. 7, with this view showing releasible engagement of said pins with rim 60 and edge 62.

Advantageously, this feature prevents the friction feet 38 from dragging along the ground when the dolly is moved. Thus the detent means, comprising the quick release pins or bullet catches 56, the apertures 58, and the retaining edges 60 and 62, serve to retain the brake pedals 24 in both the freewheeling and the braking position. This locking arrangement is released by merely stepping upon either brake pedal. The two brake pedals 24 are connected by one or more crossbars 64 which pass beneath the dolly platform 30. Preferably, the crossbars 64 are transversely oriented with respect to the longitudinal axis of the dolly, cart, etc. to which the brake mechanism is attached. FIGS. 1 and 6 illustrate an embodiment of the invention having two crossbars, a lower crossbar 66 that connects distal ends of two legs 36 and an upper crossbar 68 that is connected to the underside of each pedal 24 by screws 70 (as seen in FIG. 4) or other conventional means such as rivets, welding, etc. FIGS. 7 and 8 illustrate another embodiment of the invention wherein only the lower crossbar 66 is employed.

The crossbars 64 ensure that the brake pedals 24 remain in fixed relation relative to each other so that both pedals pivot in unison about the hinges 28. The lower crossbar 66 functions as pivot stop means for limiting the pivotal motion of the brake pedals 24. The brake pedals 24 are prohibited from pivoting beyond the point whereat the lower crossbar 66 abuts against the underside of the dolly platform as viewed in FIG. 5. This advantageously ensures that the brake pedals 24 will be prohibited from assuming a substantially vertical profile which would present difficulty to one trying to step on said pedals. Each pedal will be tilted upon abutment of the lower crossbar 66 and the dolly platform 30, however, the upwardly facing surface of each pedal, having a no-skid strip 34 thereon, will still be appropriately oriented to receive one's foot. The lower crossbar 66 is also useful as a handle for carrying the dolly, or the like.

Yet another advantage of the crossbars 64 is that said crossbars provide means for adjusting the size of the brake mechanism so that the invention can be easily retrofit to various sized dollies, carts, carriages, etc. FIGS. 6 and 6A illustrate one preferred method of providing adjustable length crossbars 64 so that the spacing between the brake pedals 24 can be adjusted to accommodate mobile units of various widths. In this version, each crossbar 64 comprises an inner angle iron 72 that slidably fits within an outer angle iron 74 such that angle irons 72 and 74 can slide relative to each other, thereby allowing the effective length of the crossbar 64 to be changed. The angle irons 72 and 74 are fixed against relative movement by a clamp 76 that is adjusted using a thumbscrew 78. If desired, these angle irons can be apertured or slotted to allow the thumbscrew 78 to pass therethrough. Alternatively, one or more telescopic crossbars 64 could be used to enable the span of the brake mechanism to be adjusted.

In accordance with another preferred embodiment of the invention, the brake mechanism can include friction feet 38 that are spring biased into tight engagement with the ground, a single crossbar 64, and an alternative hinge means. These variations are illustrated in FIGS. 7-9 in which similar parts have been designated with the same reference numerals as used in the preceding description. FIG. 8 illustrates an alternative to hinges 28, namely an axle rod 80 that is welded at preferred weld locations 81 to the brake pedal 24 at one end, and that is configured for retention within an axle bracket 82 at its opposite end. Each brake pedal can be pivotably mounted to axle brackets 82 by individual short axle rods 80, as in FIG. 8, or by a single elongated axle rod which has each of its opposite ends connected to a brake pedal. FIG. 8 also illustrates an alternative arrangement wherein the quick release pins 56 or bullet catches releasibly engage apertures provided in the dolly platform 30 rather than in a mounting bracket 26, as in FIG. 1.

FIG. 9 illustrates the afore-mentioned spring biased friction feet 38, which are similar to the friction feet of FIG. 3 with the addition of a spring 83 that encircles the threaded shaft 46. The spring 83 is retained between a nut 50 and a washer 84 and biases the friction foot 38 downwardly into frictional engagement with the ground when the brake pedals are in the braking position. That is, the springs 83 bias each friction foot 38 outwardly from the leg 36 to which the foot is attached.

In accordance with yet another preferred embodiment of the invention, and with reference to FIGS. 10-14, the legs 36 can be replaced by a single angled crossbar 86 that is attached to the underside of each brake pedal 24 by bolts 88, rivets, or the like. In this embodiment, a plurality of friction feet 38 are adjustably attached to the angled crossbar 86 at selected locations.

Adjustable attachment of the friction feet 38 is preferably achieved by passing the threaded shaft 46 of a friction foot through an unthreaded aperture 90 in the angled crossbar 86. The flat profile of the angled crossbar 86 lends itself to the provision of apertures 90 therethrough each friction foot 38 is fixed at a selected, adjustable distance from the angled crossbar using nuts 50 as depicted in FIG. 14. It must be understood that the various friction feet arrangements shown in FIGS. 3, 9 and 14 are compatible with each brake mechanism embodiment discussed herein, and each arrangement permits adjustment for optimizing the frictional contact between the friction feet and the ground or floor. Preferably, the rubber pad portion of each friction foot is configured with an enlarged surface area for optimum gripping action of the foot upon the floor.

Advantageously, the angled crossbar 86 also functions as pivot stop means for limiting the pivotal motion of the brake pedals 24. This function is depicted in FIG. 13 which illustrates abutment of the angled crossbar 86 with the underside of the dolly platform 30, thereby preventing further brake pedal motion in the direction of the arrow. This is similar to the abutment depicted in FIG. 5.

From the foregoing, it will be appreciated that the brake mechanism of the invention allows one to releasibly anchor a mobile unit to the floor in an extremely quick and easy manner requiring only foot actuation of either of the brake pedals. Further, the present invention features adjustable size means for retrofit applications and adjustable friction feet for optimum braking action. Moreover, the invention provides a plurality of brake pedals so that one can apply a braking action from either of two opposite sides of a mobile unit such as a dolly, or the like.

While several particular forms of the invention have been illustrated and described, it will also be apparent that various modifications can be made without departing from the spirit and scope of the invention. For example, the number or shape of the legs may be altered. Accordingly, it is not intended that the invention be limited, except as by the appended claims.

I claim:

1. A brake mechanism in combination with a movable platform mounted on freely rotatable casters, said brake mechanism comprising:

first and second foot pedals, said pedals being operatively connected to at least one friction foot disposed below the platform;

bracket means for mounting said first and second foot pedals at opposing locations on the movable platform, said foot pedals being pivotably attached to the bracket means such that said pedals are pivotable to a first position, whereat the at least one friction foot is raised out of engagement with a floor surface underlying the casters, and a second position, whereat the pedals are oriented horizontally and the at least one friction foot frictionally engages with the floor surface to thereby retain the platform in a stationary position;

stop means for prohibiting the foot pedal's from pivoting to a vertical orientation;

releasable lock means for maintaining the pedals in the second position; and at least one crossbar passing beneath the movable platform to connect said first and second foot pedals such that said pedals pivot in unison upon actuation of either pedal.

2. A brake mechanism in combination with a movable platform mounted on freely rotatable casters, said brake mechanism comprising:

first and second foot pedals, said pedals being operatively connected to at least one friction foot disposed below the platform;

bracket means for mounting said first and second foot pedals at opposing locations on the movable platform, said foot pedals being pivotably attached to the bracket means such that said pedals are pivotable to a first position, whereat the at least one friction foot is raised out of engagement with a floor surface underlying the casters, and a second position, whereat the at least one friction foot frictionally engages with the floor surface to thereby retain the platform in a stationary position;

releasable lock means for maintaining the pedals in the second position;

at least one crossbar passing beneath the movable platform to connect said first and second foot pedals such that said pedals pivot in unison upon actuation of either pedal; and means for adjusting the spacing between the first and second foot pedals such that the width of the brake mechanism is adjustable to correspond with various platform widths.

3. A brake mechanism as set forth in claim 2, wherein the means for adjusting the spacing between pedals comprises the at least one crossbar connecting said pedals, wherein said at least one crossbar is comprised of first and second crossbar sections that are movable relative to each other such that the length of said crossbar is adjustable, further including means for fixing the position of one crossbar section relative to the other crossbar section.

4. A brake mechanism as set forth in claim 2, further including stop means for limiting the pivotal travel of the first and second pedals.

5. A brake mechanism as set forth in claim 2, wherein the at least one friction foot is attached to the at least one crossbar.

6. A brake mechanism for use with a cart, dolly, or the like, said brake mechanism comprising:

first and second foot pedals, said pedals being operatively connected to at least one friction foot adapted for frictional engagement with a floor surface underlying the cart or dolly, with which the brake mechanism is employed;

bracket means for mounting said first and second foot pedals at opposite sides of a cart, dolly, or the like, said foot pedals being pivotably attached to the bracket means such that, with said bracket means mounted to a cart or dolly, said pedals are pivotable to a first position, whereat the at least one friction foot is located out of engagement with the floor surface, and a second position, whereat the at least one friction foot engages the floor surface to thereby retain the cart or dolly in a stationary position; and at least one crossbar connecting said first and second foot pedals such that said pedals pivot in unison upon actuation of either pedal, wherein said at least one crossbar provides means for adjusting the spacing between the first and second foot pedals such that the size of the brake mechanism is adjustable to correspond with various sizes of carts, dollies, or the like.

7. A brake mechanism as set forth in claim 6, wherein the at least one friction foot is spring biased such that said at least one friction foot is urged into contact with the floor surface when said pedals are in the second position.

8. A brake mechanism as set forth in claim 6, wherein said first and second foot pedals each have a leg extending downwardly therefrom, each leg including a friction foot extending from a distal end thereof and being of sufficient length that the friction foot associated therewith is brought into firm engagement with the floor surface when the foot pedals are in the second position.

9. A brake mechanism as set forth in claim 8, further including means for adjusting the extension of each friction foot from its associated leg.

10. A brake mechanism as set forth in claim 6, further including detent means for releasibly locking the foot pedals against movement relative to the bracket means.

11. A brake mechanism as set forth in claim 6 in combination with a cart, dolly, or the like, further including stop means for limiting the pivotal travel of the first and second pedals.

12. A brake mechanism as set forth in claim 11, wherein said at least one crossbar also provides said stop means.

13. A brake mechanism in combination with a movable platform mounted on freely rotatable casters, said brake mechanism comprising:

first and second foot pedals, said pedals each having a downwardly extending leg including a friction foot at a distal end thereof, each leg being of sufficient length that the friction foot associated therewith is brought into firm engagement with a floor surface underlying said casters upon actuation of either of said pedals to effect a braking action;

bracket means for mounting said first and second foot pedals at opposite sides of the movable platform, said foot pedals being pivotably attached to the bracket means such that said pedals are pivotable to a first position, whereat each friction foot is raised out of engagement with the floor surface, and a second position, whereat the foot pedals are horizontally oriented substantially parallel to the floor surface and each friction foot frictionally engages with the floor surface to thereby retain the platform in a stationary position, wherein at said first position said pedals are oriented at an angle of substantially 45 degrees relative to said horizontal orientation of the second position;

detent means for releasibly locking the pedals in the second position;

stop means for prohibiting said foot pedals from pivoting to a vertical orientation; and at least one crossbar transversely oriented with respect to the longitudinal axis of the movable platform, said crossbar passing beneath the platform to connect the first and second foot pedals such that said pedals pivot in unison whenever either pedal is actuated.

14. A brake mechanism in combination with a movable platform on freely rotatable casters, said brake mechanism comprising:

first and second foot pedals, said pedals each having a downwardly extending leg including a friction foot at a distal end thereof, each leg being of sufficient length that the friction foot associated therewith is brought into firm engagement with a floor surface underlying said casters upon actuation of said pedals to effect a braking action;

bracket means for mounting said first and second foot pedals at opposite sides of the movable platform, said foot pedals being pivotably attached to the bracket means such that said pedals are pivotable to a first position, whereat each friction foot is raised out of engagement with the floor surface, and a second position, whereat the foot pedals are oriented substantially parallel to the floor surface and each friction foot frictionally engages with the floor surface to thereby retain the platform in a stationary position;

detent means for releasibly locking the pedals in the second position;

at least one crossbar transversely oriented with respect to the longitudinal axis of the movable platform, said crossbar passing beneath the platform to connect the first and second foot pedals such that said pedals pivot in unison whenever either pedal is actuated; and means for adjusting the spacing between the first and second foot pedals such that the size of the brake mechanism is adjustable for compatibility with various sized platforms.

15. A brake mechanism as set forth in claim 14, further including stop means for limiting the pivotal travel of the foot pedals such that said pedals are prevented from pivoting to a substantially vertical profile.

16. A brake mechanism as set forth in claim 15, wherein said means for adjusting the spacing between pedals also provides said stop means.

17. A brake mechanism as set forth in claim 15, wherein the means for adjusting the spacing between pedals comprises the at least one crossbar connecting said pedals, wherein said at least one crossbar is comprised of first and second angle irons that fit one within the other and are slidably movable relative to each other such that the length of said crossbar is adjustable, further including clamping means for fixing the position of one angle iron relative to the other angle iron.

18. A brake mechanism as set forth in claim 15, wherein said detent means comprises at least one bullet catch provided in the bracket means and at least one pin located on the first or second foot pedal for engagement with said at least one bullet catch when the pedals are in the second position.

19. A brake mechanism as set forth in claim 15, further including means for adjustably extending each friction foot from its corresponding leg, said adjustable extension means comprising threaded shafts, each having a first end attached to a friction foot and a threaded second end adjustably retained within a threaded port in the underside of a leg.

20. A brake mechanism as set forth in claim 15, wherein the foot pedals are pivotably attached to the bracket means by hinge means, and wherein frictional surfaces are provided upon foot pedal portions which are stepped upon to operate the brake mechanism.

* * * * *